United States Patent
Lin et al.

(10) Patent No.: US 12,243,332 B2
(45) Date of Patent: Mar. 4, 2025

(54) IMAGE CAPTURING METHOD

(71) Applicant: Gogoro Inc., Hong Kong (CN)

(72) Inventors: Yi-Chia Lin, Taoyuan (TW); Chih-Min Fu, Taoyuan (TW); I-Fen Shih, Taoyuan (TW)

(73) Assignee: GOGORO, INC., Hong Kong (CN)

( * ) Notice: Subject to any disclaimer, the term of this patent is extended or adjusted under 35 U.S.C. 154(b) by 398 days.

(21) Appl. No.: 17/816,279

(22) Filed: Jul. 29, 2022

(65) Prior Publication Data

US 2023/0138373 A1     May 4, 2023

(30) Foreign Application Priority Data

Nov. 2, 2021    (TW)  .................................. 110140813

(51) Int. Cl.
| | | |
|---|---|---|
| *G06V 20/62* | (2022.01) | |
| *G06V 10/25* | (2022.01) | |
| *G06V 30/146* | (2022.01) | |
| *H04N 23/63* | (2023.01) | |

(52) U.S. Cl.
CPC ............ *G06V 20/625* (2022.01); *G06V 10/25* (2022.01); *G06V 30/147* (2022.01); *H04N 23/633* (2023.01)

(58) Field of Classification Search
CPC .... H04N 23/633; H04N 23/64; H04N 23/635; G06V 20/625; G06V 30/147; G06V 10/25
See application file for complete search history.

(56) References Cited

U.S. PATENT DOCUMENTS

| | | | | |
|---|---|---|---|---|
| 2008/0180528 A1* | 7/2008 | Saito | ........................ | H04N 7/18 |
| | | | | 348/148 |
| 2010/0082281 A1* | 4/2010 | Nakamura | ................. | G06T 7/80 |
| | | | | 702/95 |
| 2014/0132707 A1* | 5/2014 | Hashimoto | .......... | H04N 13/239 |
| | | | | 348/36 |

(Continued)

FOREIGN PATENT DOCUMENTS

| | | |
|---|---|---|
| CN | 105872358 A | 8/2016 |
| CN | 105469384 B | 9/2018 |

(Continued)

OTHER PUBLICATIONS

European Search Report mailed Apr. 22, 2022 for European Patent Application No. 21205865.5, 4 pages.

(Continued)

*Primary Examiner* — Congvan Tran

(74) *Attorney, Agent, or Firm* — Perkins Coie LLP

(57) ABSTRACT

An image capturing method has: providing an image capturing area on a display screen of a user device; providing an indication area in the image capturing area; identifying each license plate in the indication area; calculating a license plate area of said each license plate in the indication area; calculating a center point difference from a center point of said each license plate in the indication area to a center point of the indication area; marking a license plate that has a license plate area larger than half of a largest license plate area and has a smallest center point difference; and capturing an image including the marked license plate in the image capturing area.

10 Claims, 6 Drawing Sheets

(56) References Cited

U.S. PATENT DOCUMENTS

| | | | | |
|---|---|---|---|---|
| 2015/0262025 A1* | 9/2015 | Yasui | ............... | H04N 7/181 |
| | | | | 348/142 |
| 2020/0125876 A1* | 4/2020 | Cai | ............ | G06V 20/63 |
| 2020/0382705 A1 | 12/2020 | Funaki et al. | | |
| 2021/0097707 A1* | 4/2021 | Oba | ............ | G08G 1/167 |
| 2022/0027642 A1* | 1/2022 | Shambik | ............ | G06T 7/20 |

FOREIGN PATENT DOCUMENTS

| | | |
|---|---|---|
| KR | 20160121242 A | 10/2016 |
| KR | 102223059 B1 | 3/2021 |
| TW | 201528159 A | 7/2015 |

OTHER PUBLICATIONS

Office Action and Search Report mailed May 13, 2022 for Taiwanese Patent Application No. 110140813, 15 pages.
Office Action mailed Nov. 29, 2023 for Korean Patent Application No. 10-2022-0122371, 5 pages.

* cited by examiner

IMAGE CAPTURING METHOD

CROSS-REFERENCE TO RELATED APPLICATION

This application claims priority to Taiwan Application Serial Number 110140813, filed Nov. 2, 2021, which is herein incorporated by reference.

BACKGROUND

Technical Field

The present disclosure relates to an image capturing method.

Description of Related Art

Shared motor vehicles provide a lot of convenience for the people. The rent-and-return characteristic combined with electric motor vehicles allows users to move more maneuverable and have a longer travel distance than shared bicycles, while also taking into account the environmental protection effect.

However, the shared motor vehicles are also often disputed because of the rental and return characteristic. For example, after returning a motor vehicle, the user will receive a ticket due to the movement of the motor vehicle by others. The user will have a poor user experience due to the failure to provide proof of returning the motor vehicle.

Accordingly, how to provide an image capturing method to solve the aforementioned problems becomes an important issue to be solved by those in the industry.

SUMMARY

An aspect of the disclosure is to provide an image capturing method that can efficiently solve the aforementioned problems.

According to an embodiment of the disclosure, an image capturing method includes: providing an image capturing area on a display screen of a user device; providing an indication area in the image capturing area; identifying each license plate in the indication area; calculating a license plate area of said each license plate in the indication area; calculating a center point difference from a center point of said each license plate in the indication area to a center point of the indication area; marking a license plate that has a license plate area larger than half of a largest license plate area and has a smallest center point difference; and capturing an image including the marked license plate in the image capturing area.

In an embodiment of the disclosure, the identifying said each license plate in the indication area includes: identifying said each license plate based on at least one license plate feature.

In an embodiment of the disclosure, the at least one license plate feature includes English letters and numbers with a predetermined format/number of characters and a predetermined aspect ratio of license plate.

In an embodiment of the disclosure, the image capturing method further includes: further providing an operation area on the display screen, in which the operation area and the image capturing area are side by side.

In an embodiment of the disclosure, the operation area provides at least one of a shooting virtual button, a flash virtual button, a re-shooting virtual button, and an upload virtual button.

In an embodiment of the disclosure, the image capturing method further includes: further providing a guidance information display area in the image capturing area.

In an embodiment of the disclosure, the guidance information display area provides a dialog box or a timing indicator.

In an embodiment of the disclosure, the image capturing method further includes: when the license plate having the license plate area larger than half of the largest license plate area and having the smallest center point difference moves outside the indication area, providing a guide description in a guidance information display area.

In an embodiment of the disclosure, the image capturing method further includes: when the license plate having the license plate area larger than half of the largest license plate area and having the smallest center point difference is marked, providing a timing indicator in a guidance information display area.

In an embodiment of the disclosure, the capturing the image includes: capturing the image at an end of countdown of the timing indicator.

Accordingly, in the image capturing method of the present disclosure, the indication area provided in the image capturing area can guide the user to obtain an image with a specific composition to ensure that the image is saved with specific information. By marking the license plate that has a license plate area larger than half of the largest license plate area and has the smallest center point difference, the user's recognition of the license plate can be improved, thereby reducing the time for the user to capture images. By limiting that the image is captured only when the marked license plate is present in the indication area in the predetermined ratio for a predetermined period of time, the stability of capturing the image can be increased to make the obtained image clearer. By combining the image capturing method with a vehicle return system, the user can be assisted to save the return record by capturing images, so as to reduce return disputes.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
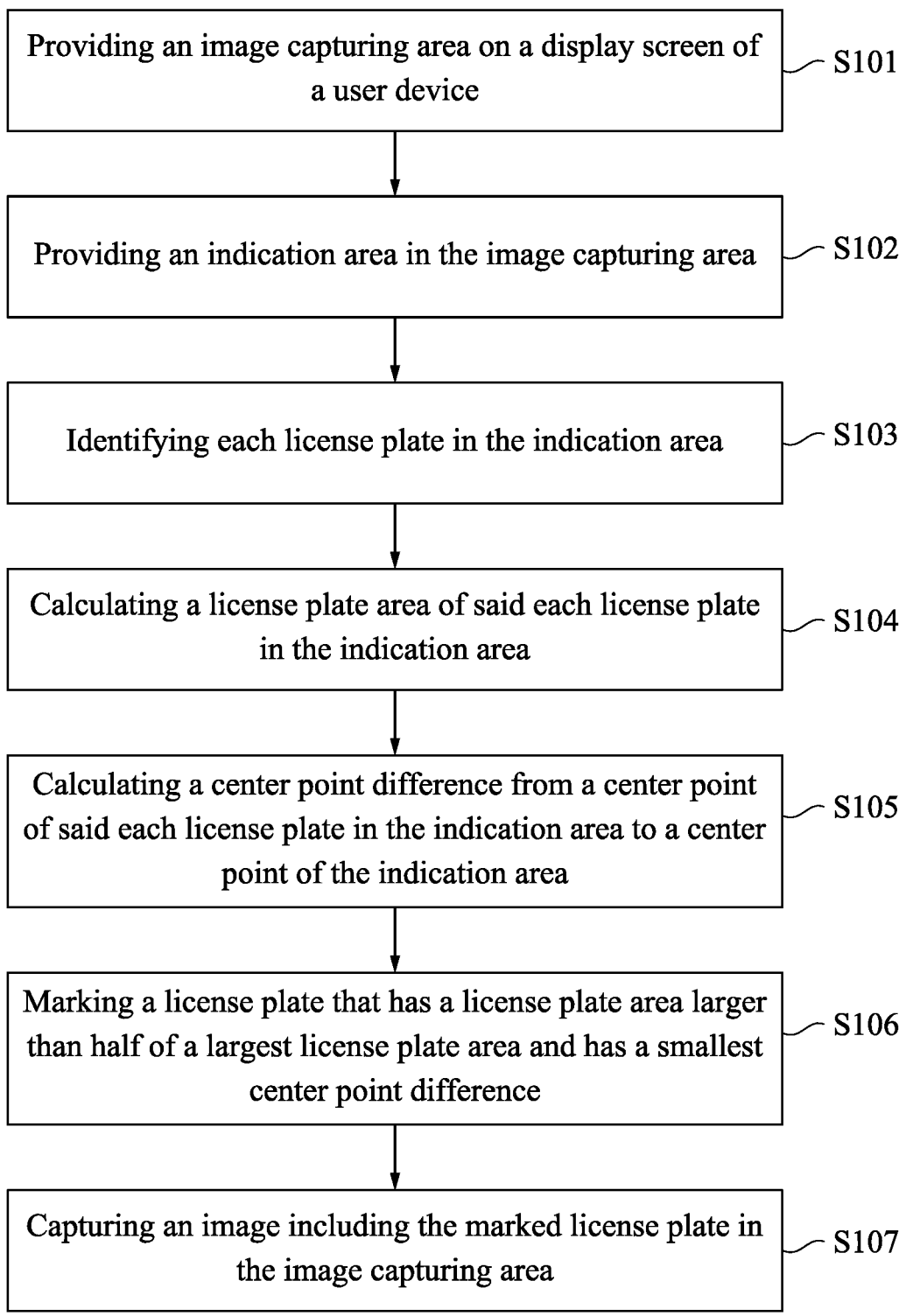
FIG. 1 is a flow chart of an image capturing method according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1 with reference to FIGS. 2 to 6 together. FIG. 1 is a flow chart of an image capturing method according to an embodiment of the present disclosure. FIGS. 2 to 6 are schematic diagrams respectively showing different steps of the image capturing method according to an embodiment of the present disclosure. As shown in FIG. 1, in the present disclosure, the image capturing method mainly includes step S101 to step S107.

Step S101: providing an image capturing area 111 on a display screen 110 of a user device 100.

Step S102: providing an indication area 112 in the image capturing area 111.

Step S103: identifying each license plate in the indication area 112.

Step S104: calculating a license plate area of said each license plate in the indication area 112.

Step S105: calculating a center point difference from a center point of said each license plate in the indication area 112 to a center point C0 of the indication area 112.

Step S106: marking a license plate that has a license plate area larger than half of a largest license plate area and has a smallest center point difference.

Step S107: capturing an image including the marked license plate in the image capturing area 111.

In some embodiments, the user device 100 is, for example, a smart phone, but the disclosure is not limited in this regard. In some embodiments, the user device 100 further includes a camera module (not shown). The camera module is configured to take pictures of the surroundings of the user device 100. The display screen 110 is configured to display the scene shot by the camera module in the image capturing area 111.

As shown in FIGS. 2 to 6, in the present embodiment, in the image capturing area 111, a scene of vehicles respectively with a license plate 900A and a license plate 900B is taken as an example.

In some embodiments, step S103 includes step S103a.

Step S103a: identifying said each license plate based on at least one feature.

In some embodiments, the at least one feature may be the license plate features including English letters and numbers with a predetermined format/number of characters and a predetermined aspect ratio of license plate, but the disclosure is not limited in this regard. For example, the predetermined format may include a font format and/or an arrangement order format of the English letters and numbers of license plates of various types of traffic vehicles that comply with local regulations, but the disclosure is not limited in this regard. For example, the predetermined aspect ratio of license plate may be a specific range of aspect ratios of the license plates of the various traffic vehicles that comply with local regulations.

Figure 2:
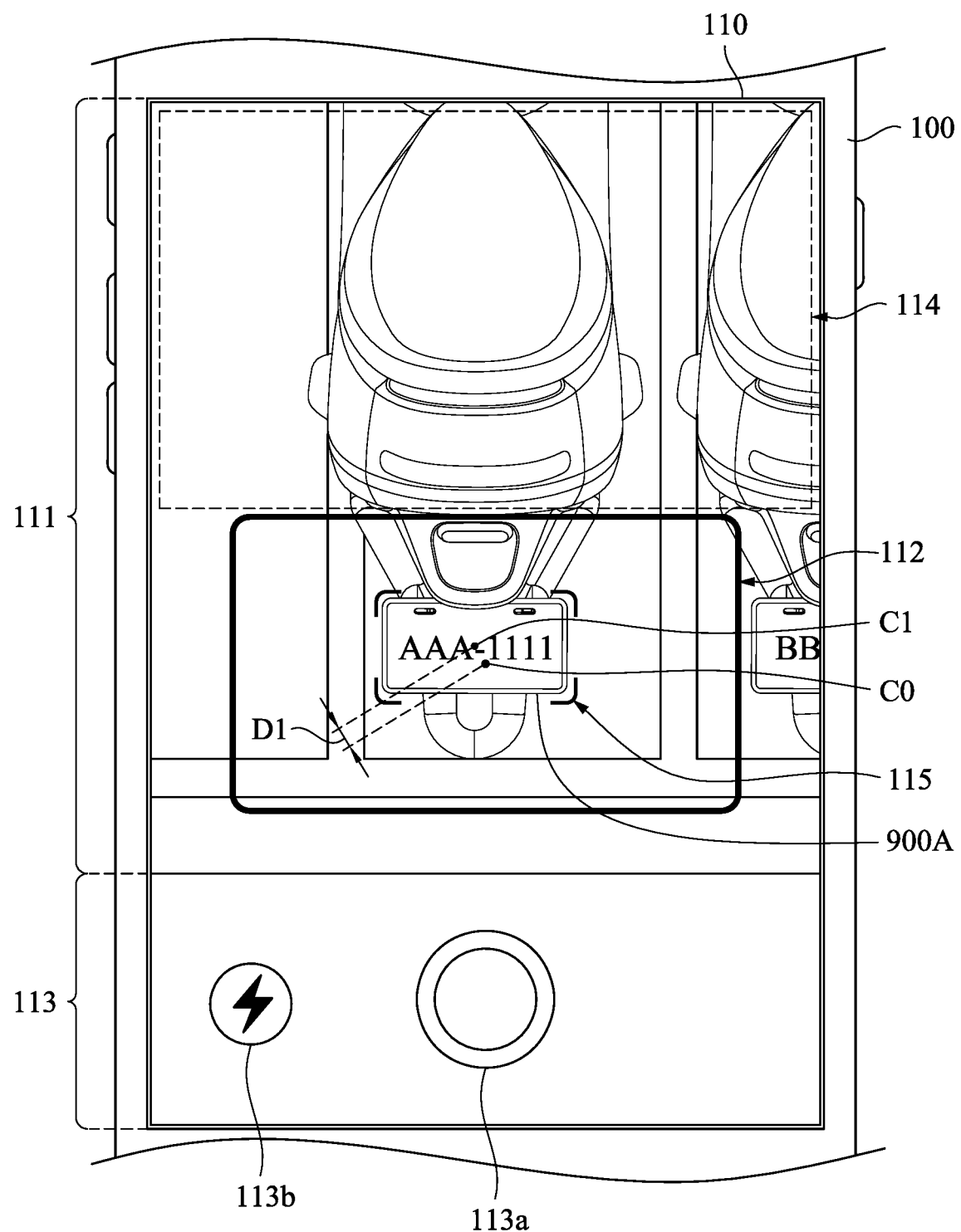
FIG. 2 is a schematic diagram showing one of steps of the image capturing method according to an embodiment of the present disclosure.

As shown in FIG. 2, in the present embodiment, the indication area 112 has a center point C0. The license plate 900A has a center point C1. The center point C1 of the license plate 900A and the center point C0 are separated by a center point difference D1. Since only the license plate 900A appears in the indication area 112, the license plate 900A is the license plate with the largest license plate area and the smallest center point difference in the indication area 112. Accordingly, according to step S106, the license plate 900A is marked in FIG. 2 because it has the license plate area greater than half of the largest license plate area and the smallest center point difference.

In some embodiments, step S106 includes step S106a.

Step S106a: providing a marking area 115 in the image capturing area 111 to mark the license plate.

As shown in FIGS. 2 to 5, in the present embodiment, the indication area 112 may be marked by a frame formed by a solid line, and the marking area 115 may be marked by a frame formed by a dotted line, so as to improve the clarity of identification when the user operates the user device 100, but the disclosure is not limited in this regard. In practical applications, the indication area 112 and the marking area 115 may also be marked with different types or colors of frame or color blocks.

Figure 3:
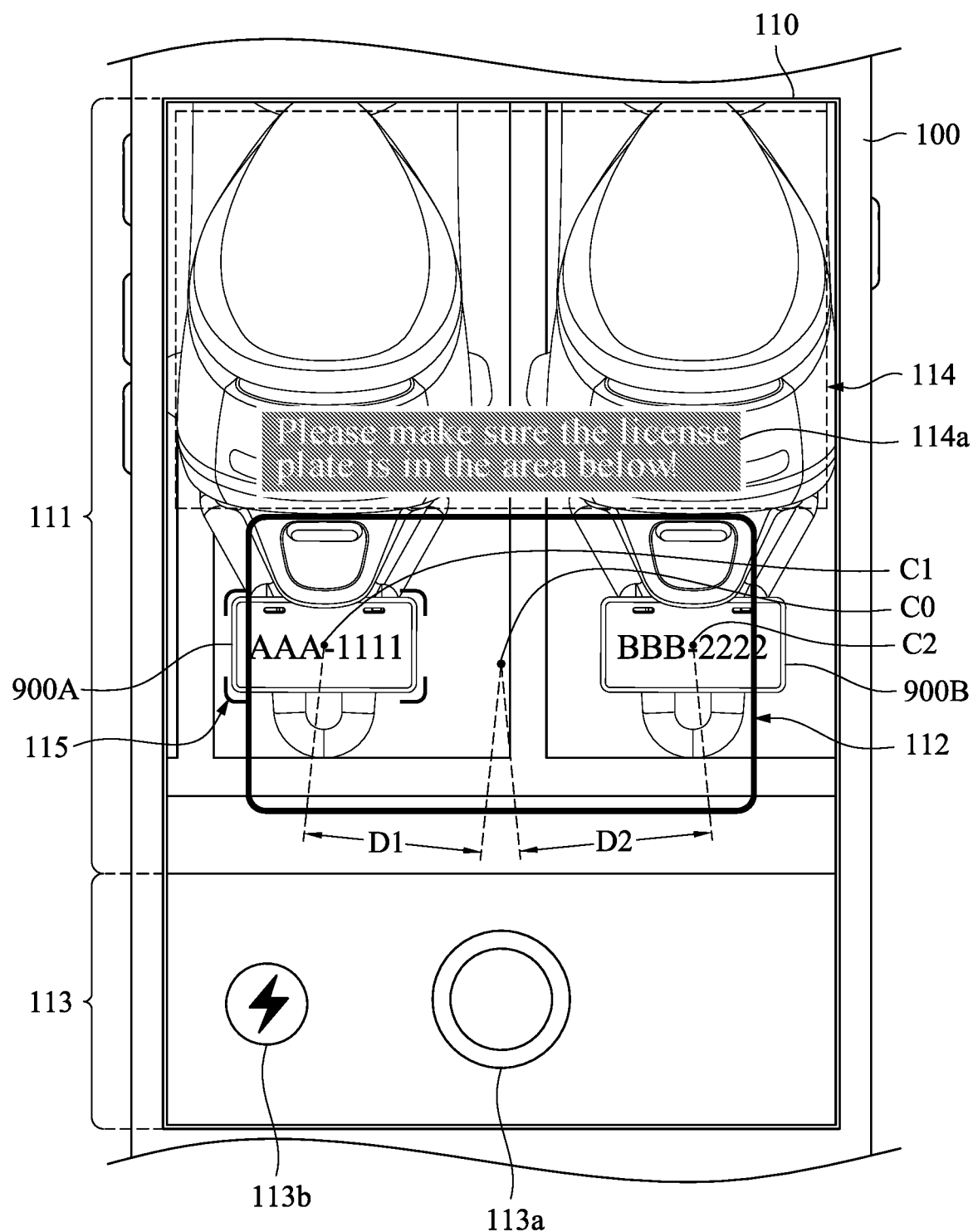
FIG. 3 is a schematic diagram showing one of steps of the image capturing method according to an embodiment of the present disclosure.

As shown in FIG. 3, in the present embodiment, when the user moves the user device 100 so that at least a part of each of multiple license plates (such as the license plate 900A and the license plate 900B) appears in the indication area 112, one of the license plate 900A and the license plate 900B will be marked according to step S106.

In some embodiments, in the image presented by the image capturing area 111 in FIG. 3, the license plate 900A has a slightly larger license plate area than the license plate 900B (that is, the license plate 900A has the largest license plate area), and the center point difference D1 from the center point C1 of the license plate 900A to the center point C0 is smaller than the center point difference D2 from the center point C2 of the license plate 900B to the center point C0 (that is, the license plate 900A has the smallest center point difference). Accordingly, the license plate 900A (of a rental vehicle) is marked in FIG. 3 because it has the license plate area greater than half of the largest license plate area (that is, the license plate area of the license plate 900A itself) and the smallest center point difference according to step S106.

In some embodiments, in the image presented by the image capturing area 111 in FIG. 3, the license plate 900A has a slightly smaller license plate area than the license plate 900B (that is, the license plate 900B has the largest license plate area), but the center point difference D1 from the center point C1 of the license plate 900A to the center point C0 is smaller than the center point difference D2 from the center point C2 of the license plate 900B to the center point C0 (that is, the license plate 900A has the smallest center point difference). Accordingly, the license plate 900A is marked in FIG. 3 because it has the license plate area greater than half of the largest license plate area (that is, the license plate area of the license plate 900B) and the smallest center point difference according to step S106.

In some embodiments, the image capturing method further includes step S108.

Step S108: further providing a guidance information display area 114 in the image capturing area 111.

As shown in FIG. 3, in the present embodiment, the guidance information display area 114 is indicated by a dotted line. The guidance information display area 114 provides a dialog box 114a.

In some embodiments, step S108 further includes step S108a.

Step S108a: when the license plate having the license plate area larger than half of the largest license plate area and having the smallest center point difference moves outside the indication area 112, providing a guide description in the guidance information display area 114.

As shown in FIG. 3, in the present embodiment, when step S106 is performed according to the image capturing method of the present disclosure but it is found that the marked license plate 900A moves outside the indication area 112, the guidance information display area 114 may provide the dialog box 114a and display a guide description in the dialog box 114a. For example, the dialog box 114a may display the guide description "Please make sure the license plate is in the area below!", but the disclosure is not limited in this regard. The aforementioned guide description may indicate the user to move the user device 100 to adjust the viewing angle of the camera module, so that the marked license plate 900A can be located in the indication area 112.

In some embodiments, when step S106 is performed according to the image capturing method of the present disclosure but it is found that the marked license plate 900 is not presented in a predetermined ratio, the guidance information display area 114 may provide the dialog box 114a and display a guide description in the dialog box 114a. For example, the dialog box 114a may display the guide description "Please come closer!", but the disclosure is not limited in this regard. The aforementioned guide description may indicate the user to move the user device 100 to adjust the distance between the camera module and the license plate 900A of the rental vehicle, so that the marked license plate 900A is displayed in the indication area 112 in the predetermined ratio. In this way, the personal safety problem caused by the user being too close to the lane can be avoided.

In some embodiments, the predetermined ratio is a ratio of the license plate 900A located in the indication area 112 to the image capturing area 111 (for example, a width ratio or an area ratio), but the disclosure is not limited in this regard. For example, the width ratio of the license plate 900A to the image capturing area 111 is between ¼ and ¾, but the disclosure is not limited in this regard.

As shown in FIG., in the present embodiment, the user continues to move the user device 100 so that the center point C1 of the license plate 900A is far away from the center point C0 of the indication area 112 and the center point C2 of the license plate 900B is close to the center point C0 of the indication area 112. According to step S106, one of the license plate 900A and the license plate 900B will still be marked.

Figure 4:
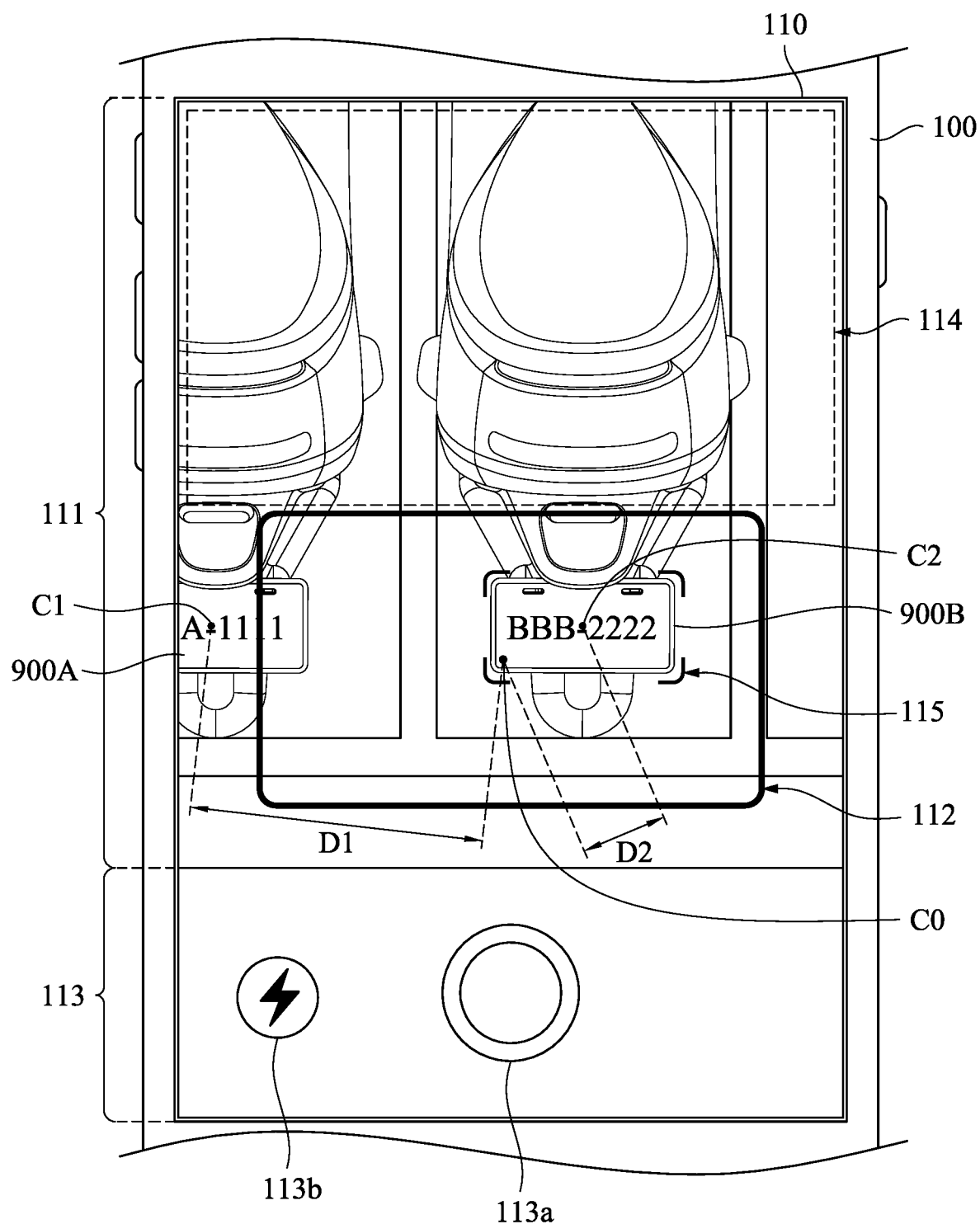
FIG. 4 is a schematic diagram showing one of steps of the image capturing method according to an embodiment of the present disclosure.

In detail, in the image presented by the image capturing area 111 in FIG. 4, the license plate 900A has a smaller license plate area than the license plate 900B (that is, the license plate 900B has the largest license plate area), and the center point difference D1 from the center point C1 of the license plate 900A to the center point C0 is greater than the center point difference D2 from the center point C2 of the license plate 900B to the center point C0 (that is, the license plate 900B has the smallest center point difference). Accordingly, the license plate 900B is marked in FIG. 4 because it has the license plate area greater than half of the largest license plate area (that is, the license plate area of the license plate 900B) and the smallest center point difference according to step S106. That is, the marking area 115 that originally marked the license plate 900A in FIG. 3 will be changed to mark the license plate 900B in FIG. 4.

In some embodiments, the image capturing method further includes step S108b.

Step S108b: when the license plate having the license plate area larger than half of the largest license plate area and having the smallest center point difference is marked, providing a timing indicator 114b in the guidance information display area 114.

Figure 5:
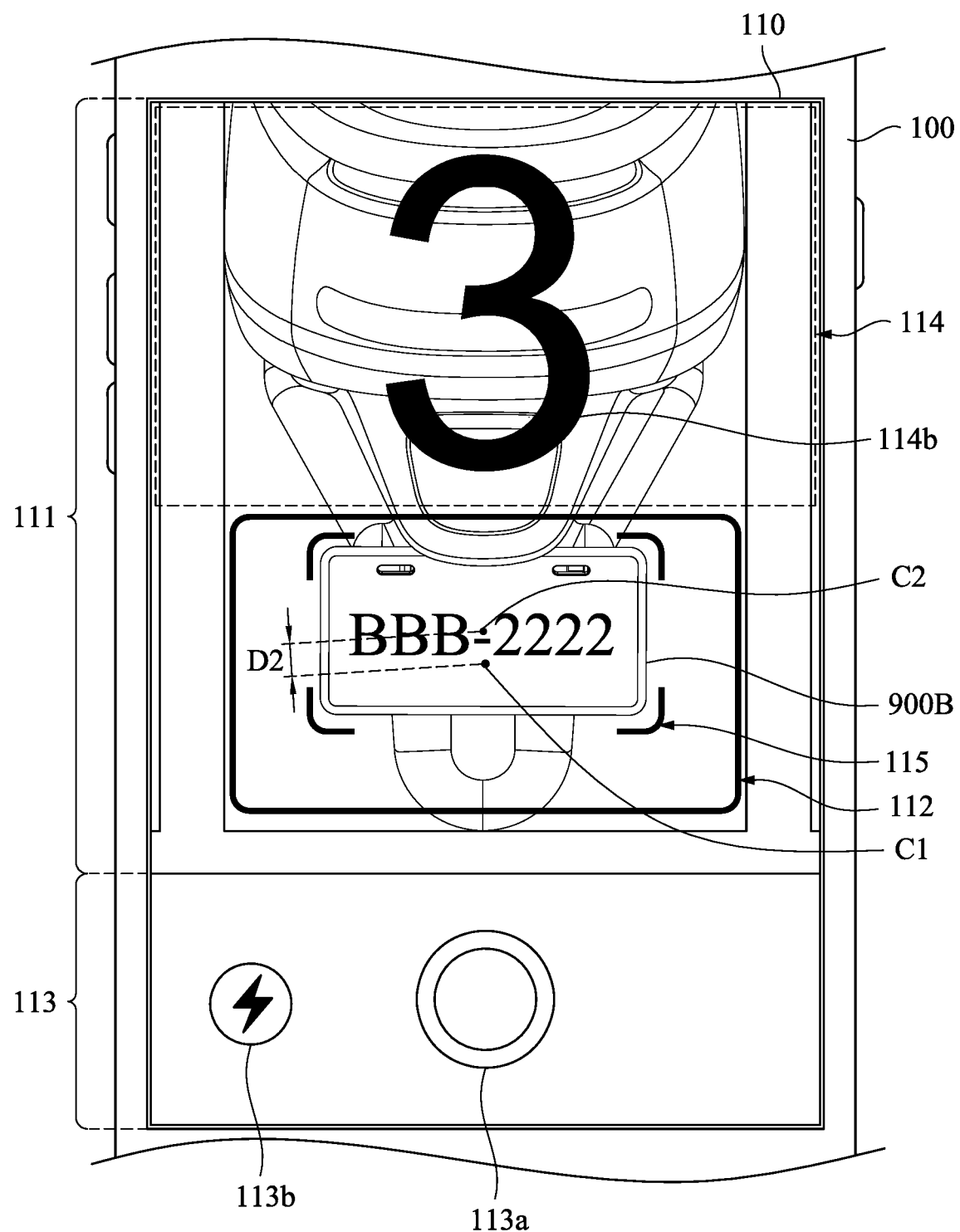
FIG. 5 is a schematic diagram showing one of steps of the image capturing method according to an embodiment of the present disclosure.

As shown in FIG. 5, in the present embodiment, when the license plate 900B having the license plate area larger than half of the largest license plate area and a smallest center point difference is marked, the guidance information display area 114 may provide the timing indicator 114b. For example, the timing indicator 114b may be presented in the form of numbers, but the disclosure is not limited in this regard. For example, the timing indicator 114b may count down from 3, but the disclosure is not limited in this regard.

In some embodiments, step S107 further includes step S107a.

Step S107a: capturing the image at an end of countdown of the timing indicator 114b.

As shown in FIG. 5, the image presented in the image capturing area 111 is the image captured when the countdown of the timing indicator 114b ends.

In some embodiments, the image capturing method further includes step S109.

Step S109: further providing an operation area 113 on the display screen 110, in which the operation area 113 and the image capturing area 111 are side by side.

As shown in FIGS. 2 to 6, the image capturing area 111 and the operation area 113 are arranged side by side on the display screen 110 up and down, but the disclosure is not limited in this regard.

As shown in FIGS. 2 to 5, in the present embodiment, the operation area 113 may provide a shooting virtual button 113a and a flash virtual button 113b, but the disclosure is not limited in this regard. The shooting virtual button 113a may provide a function of manually capturing an image for a user who does not need to automatically capture the image based on the image capturing method of the present disclosure. The flash virtual button 113b may provide a function for the user to select whether to enable the camera module to turn on the flash when capturing the image.

Figure 6:
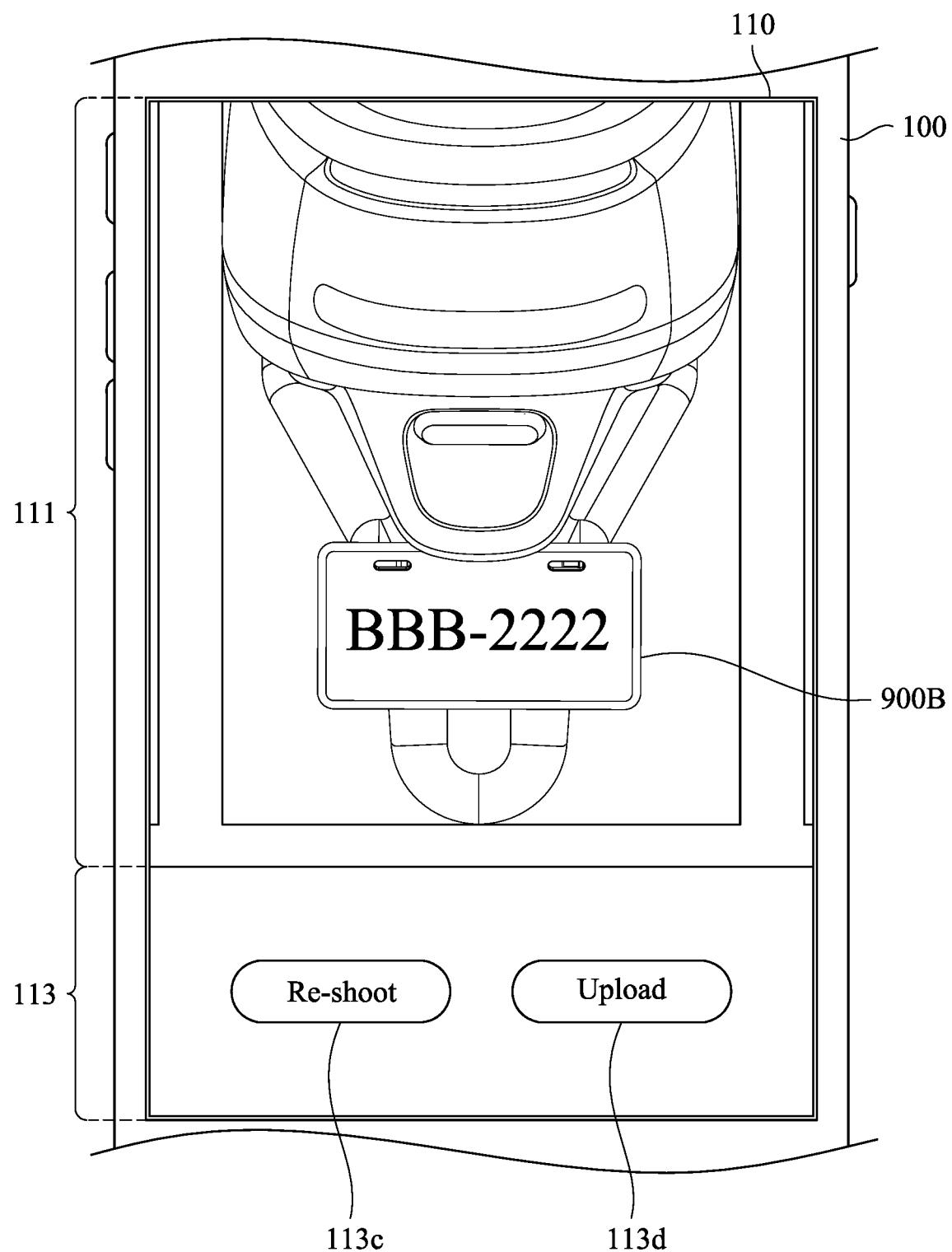
FIG. 6 is a schematic diagram showing one of steps of the image capturing method according to an embodiment of the present disclosure.

As shown in FIG. 6, in the present embodiment, after the image is captured based on the image capturing method of the present disclosure, the operation area 113 may provide a re-shooting virtual button 113c and an upload virtual button 113d, but the disclosure is not limited in this regard. The re-shooting virtual button 113c may provide the user with a function of re-shooting an image. The upload virtual button 113d may provide the user with a function of uploading the captured image to a cloud storage device of a vehicle return system as a proof of returning the rental vehicle.

In some embodiments, when uploading the captured image, the satellite positioning information of the location of the captured image can be sent at the same time to more clearly record the parking position (return position) of the vehicle. The clear location of the vehicle can help the user find the vehicle more quickly the next time it is used, thereby saving the user the time to find the vehicle.

In some embodiments, the image capturing method of the present disclosure can be combined with a vehicle return system, so as to assist the user to save the return record by capturing images and thus reduce return disputes. For example, the image capturing method disclosed in the present disclosure can prevent the user from paying additional rental fees or paying a ticket because the vehicle is moved by others after returning the vehicle.

According to the foregoing recitations of the embodiments of the disclosure, it can be seen that in the image capturing method of the present disclosure, the indication area provided in the image capturing area can guide the user to obtain an image with a specific composition to ensure that the image is saved with specific information. By marking the license plate that has a license plate area larger than half of the largest license plate area and has the smallest center point difference, the user's recognition of the license plate can be improved, thereby reducing the time for the user to capture images. By limiting that the image is captured only when the marked license plate is present in the indication area in the predetermined ratio for a predetermined period of time, the stability of capturing the image can be increased to make the obtained image clearer. By combining the image capturing method with a vehicle return system, the user can be assisted to save the return record by capturing images, so as to reduce return disputes.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing method, comprising:
    providing an image capturing area on a display screen of a user device;
    providing an indication area in the image capturing area;
    identifying each license plate in the indication area;
    calculating a license plate area of said each license plate in the indication area;
    calculating a center point difference from a center point of said each license plate in the indication area to a center point of the indication area;
    marking a license plate that has a license plate area larger than half of a largest license plate area and has a smallest center point difference; and
    capturing an image including the marked license plate in the image capturing area.

2. The image capturing method of claim 1, wherein the identifying said each license plate in the indication area comprises:
    identifying said each license plate based on at least one license plate feature.

3. The image capturing method of claim 2, wherein the at least one license plate feature comprises English letters and numbers with a predetermined format/number of characters and a predetermined aspect ratio of license plate.

4. The image capturing method of claim 1, comprising:
    further providing an operation area on the display screen, wherein the operation area and the image capturing area are side by side.

5. The image capturing method of claim 4, wherein the operation area provides at least one of a shooting virtual button, a flash virtual button, a re-shooting virtual button, and an upload virtual button.

6. The image capturing method of claim 1, comprising:
    further providing a guidance information display area in the image capturing area.

7. The image capturing method of claim 6, wherein the guidance information display area provides a dialog box or a timing indicator.

8. The image capturing method of claim 1, comprising:
    when the license plate having the license plate area larger than half of the largest license plate area and having the smallest center point difference moves outside the indication area, providing a guide description in a guidance information display area.

9. The image capturing method of claim 1, comprising:
    when the license plate having the license plate area larger than half of the largest license plate area and having the smallest center point difference is marked, providing a timing indicator in a guidance information display area.

10. The image capturing method of claim 9, wherein the capturing the image comprises:
    capturing the image at an end of countdown of the timing indicator.

* * * * *